(12) United States Patent
Sato et al.

(10) Patent No.: US 10,437,234 B2
(45) Date of Patent: Oct. 8, 2019

(54) MACHINING TIME CALCULATING APPARATUS AND MACHINING TIME CALCULATING METHOD

(71) Applicant: Mitsubishi Electric Corporation, Chiyoda-ku (JP)

(72) Inventors: Goh Sato, Tokyo (JP); Mitsuo Watanabe, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/096,146

(22) PCT Filed: Jun. 20, 2016

(86) PCT No.: PCT/JP2016/068295
§ 371 (c)(1),
(2) Date: Oct. 24, 2018

(87) PCT Pub. No.: WO2017/221309
PCT Pub. Date: Dec. 28, 2017

(65) Prior Publication Data
US 2019/0137977 A1    May 9, 2019

(51) Int. Cl.
*G05B 19/4155* (2006.01)
*G05B 19/416* (2006.01)
*G05B 19/418* (2006.01)

(52) U.S. Cl.
CPC ....... *G05B 19/4155* (2013.01); *G05B 19/418* (2013.01); *G05B 19/4163* (2013.01)

(58) Field of Classification Search
CPC ............ G05B 19/4155; G05B 19/4163; G05B 19/418
See application file for complete search history.

(56) References Cited

FOREIGN PATENT DOCUMENTS

| JP | 5-63749 U | 8/1993 |
|---|---|---|
| JP | 7-319520 A | 12/1995 |
| JP | 2007-233624 A | 9/2007 |
| JP | 4738585 B2 | 8/2011 |

OTHER PUBLICATIONS

S.F. Attar et al., "Hybrid flexible flowshop scheduling problem with unrelated parallel machines and limited waiting times," Int. J. Adv. Manuf. Technol. vol. 68, pp. 1583-1599, 2013.*
International Search Report dated Sep. 6, 2016 in PCT/JP2016/068295 filed Jun. 20, 2016.

* cited by examiner

*Primary Examiner* — Christopher E. Everett
(74) *Attorney, Agent, or Firm* — Oblon, McClelland, Maier & Neustadt, L.L.P.

(57) ABSTRACT

A machining time calculating apparatus calculates operation schedule information indicating the operation time of each of a plurality of systems that is included in a machine tool and can be controlled independently of one another. The machining time calculating apparatus includes a system cycle time calculation unit. On the basis of wait commands among the plurality of systems described in a machining program (PG) for the machine tool, the system cycle time calculation unit calculates the operation schedule information in which the operation start times of blocks in the machining program of each of the systems are adjusted while maintaining wait timings among the plurality of systems.

5 Claims, 14 Drawing Sheets

| SYSTEM NUMBER | BLOCK NUMBER | BLOCK EXECUTION TIME |
|---|---|---|
| 1 | B11 | 0´30" |
| 1 | B12L1 | 0´0" |
| 1 | B13 | 0´50" |
| 1 | B14L3 | 0´0" |
| 1 | B15 | 0´50" |
| 2 | B21 | 0´15" |
| 2 | B22L1 | 0´0" |
| 2 | B23 | 0´30" |
| ⋮ | ⋮ | ⋮ |

| WAIT COMMAND IDENTIFICATION NUMBER | SYSTEM NUMBER | BLOCK NUMBER | SYSTEM NUMBER | BLOCK NUMBER |
|---|---|---|---|---|
| L1 | 1 | B12L1 | 2 | B22L1 |
| L2 | 2 | B24L2 | 3 | B32L2 |
| L3 | 1 | B14L3 | 3 | B34L3 |

| SYSTEM NUMBER | OPERATION START TIME | OPERATION END TIME | CYCLE TIME |
|---|---|---|---|
| 1 | 0′30″ | 2′40″ | 2′10″ |
| 2 | 0′45″ | 2′10″ | 1′25″ |
| 3 | 0′0″ | 2′20″ | 2′20″ |

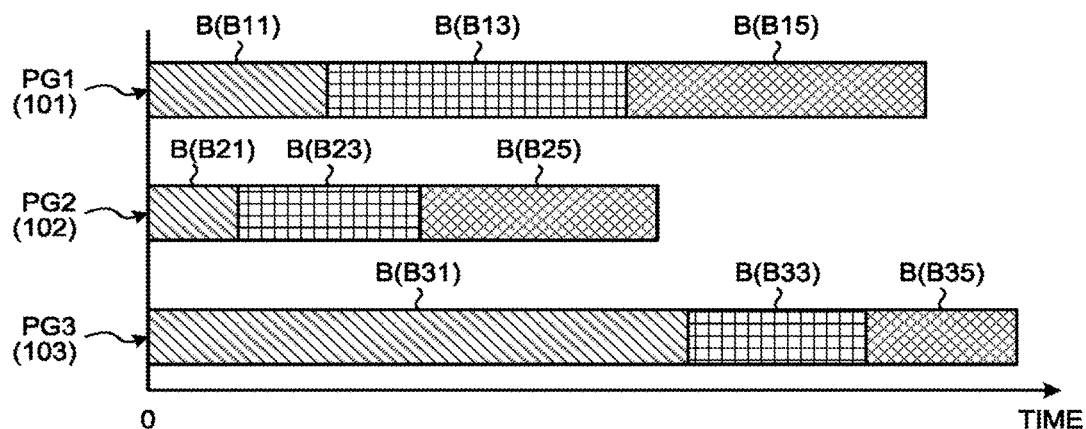
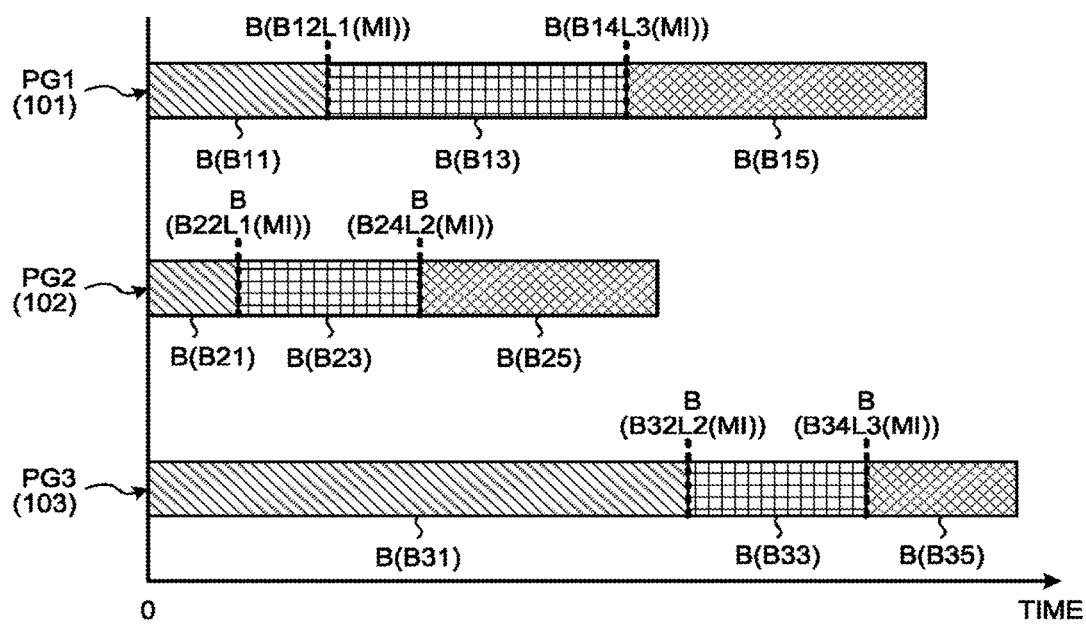

MACHINING TIME CALCULATING APPARATUS AND MACHINING TIME CALCULATING METHOD

FIELD

The present invention relates to a machining time calculating apparatus and a machining time calculating method for calculating machining time of a numerically controlled machine tool.

BACKGROUND

Production plans are usually made at production sites to achieve efficient production. The production plan is based on production capacity of a facility and personnel, delivery time, and inventory. When making a production plan for machining, a planner of the production plan expresses the production capacity of a facility in terms of machining time for each workpiece. Thus, when making the production plan, the planner of the production plan needs to know in advance the machining time of each workpiece. Knowing the machining time accurately is also important for the planner of the production plan to make an accurate production plan.

Patent Literature 1 discloses an invention for calculating the machining time of a numerically controlled machine tool on the basis of an NC program. The invention disclosed in Patent Literature 1 grasps the machining time for each line (hereinafter referred to as a block) of a machining program. The invention disclosed in Patent Literature 1 calculates execution time of a block from the amount and speed of movement when the block specifies axis move command. The invention disclosed in Patent Literature 1 sets preset operating time as the execution time of a block when the block specifies an auxiliary function command. After calculating the execution time of each block, the invention disclosed in Patent Literature 1 calculates the machining time by adding the execution times of the blocks in the order of execution of the blocks.

A numerically controlled machine tool including a plurality of systems that can be controlled independently can perform program search and cycle start independently for each system. The numerically controlled machine tool is also controlled using a wait command to simultaneously execute a plurality of blocks in different systems. When the wait command is set for a plurality of blocks to be started simultaneously, the numerically controlled machine tool is controlled such that a system first completing execution of a block preceding the block to which the wait command is set waits for a system completing execution of the block later to match the timing for starting the execution of the blocks. The system waiting for another system by the wait command has a wait time. The numerically controlled machine tool needs to calculate the wait time in order to calculate machining time of each system. Patent Literature 2 discloses a method of calculating the machining time including the wait time. When a system has a waiting block, the method disclosed in Patent Literature 2 finds the elapsed times to the corresponding waiting block in other systems and, by using the longest elapsed time as the start time for the next waiting block, calculates the elapsed time to the next block.

CITATION LIST

Patent Literature

Patent Literature 1: Japanese Unexamined Utility Model Application Publication No. H5-63749
Patent Literature 2: Japanese Patent No. 4738565

SUMMARY

Technical Problem

However, even for a numerically controlled machine tool including a plurality of systems, a conventional machining time calculating method performs cycle start on all the systems simultaneously and calculates the machining time by adding the execution times of the blocks in the order of execution. The conventional machining time calculating method thus often allows for inclusion of the wait time in the machining time being calculated when two or more systems have blocks that start to be executed simultaneously. The wait time is the time for one system first completing execution of a block immediately preceding the block that starts to be executed simultaneously to wait before executing the block that starts to be executed simultaneously with the other systems. The numerically controlled machine tool cannot allow the waiting system to perform machining, thereby having a reduced production efficiency as the wait time increases. Thus, the production efficiency is reduced with the production plan that is based on the machining time calculated by the conventional machining time calculating method.

An object of the present invention is to obtain machining time calculating apparatus that can calculate machining time of a machine tool necessary for making a production plan with high production efficiency.

Solution to Problem

In order to solve the above problem and achieve the object, the present invention provides a machining time calculating apparatus that calculates operation schedule information indicating the operation time of each of a plurality of systems that is included in a machine tool and can be controlled independently of one another. The machining time calculating apparatus includes a system cycle time calculation unit. On the basis of wait commands among the plurality of systems described in a machining program for the machine tool, the system cycle time calculation unit calculates the operation schedule information in which the operation start times of blocks in the machining program of each of the systems are adjusted while maintaining wait timings among the plurality of systems.

Advantageous Effects of Invention

A machining time calculating method according to the present invention can calculate the machining time of the machine tool necessary for making the production plan with high production efficiency.

BRIEF DESCRIPTION OF DRAWINGS

FIG. 4 is a table illustrating wait command information output by a wait command analysis unit of the machining time calculating apparatus illustrated in FIG. 1.

FIG. 5 is a table illustrating operation schedule information calculated by a system cycle time calculation unit of the machining time calculating apparatus illustrated in FIG. 1.

FIG. 9 is a diagram illustrating an example of a time chart generated from operation start times and operation end times of blocks that are calculated in step S42 of FIG. 8.

FIG. 10 is a diagram illustrating an example of a time chart generated from operation start times and operation end times of the blocks that are calculated in step S43 of FIG. 8.

DESCRIPTION OF EMBODIMENTS

A machining time calculating apparatus and a machining time calculating method according to an embodiment of the present invention will be described below in detail with reference to the drawings. Note that the present invention is not limited to the embodiment.

First Embodiment

Figure 1:
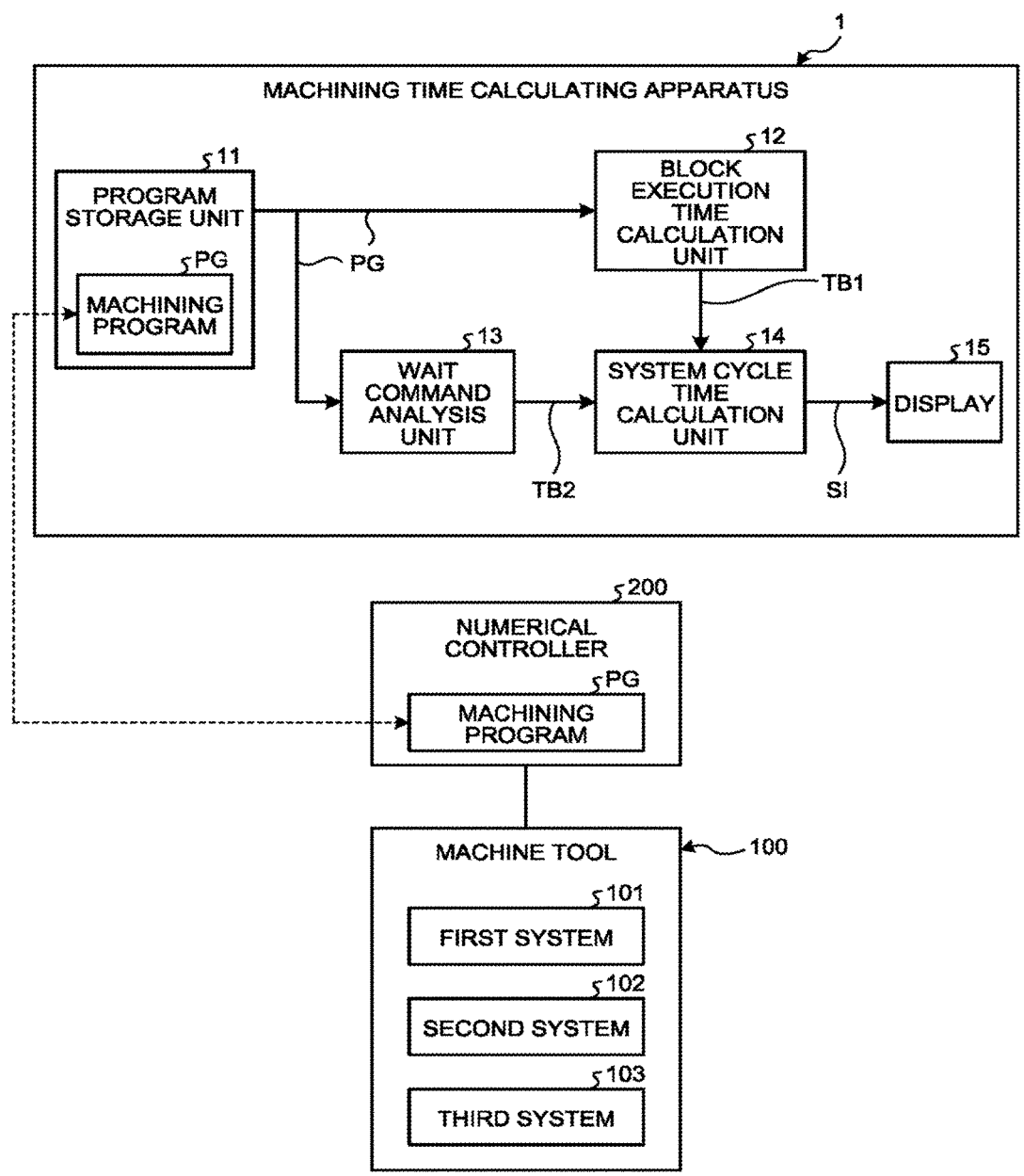
FIG. 1 is a functional block diagram illustrating the configuration of a machining time calculating apparatus according to a first embodiment.
Figures 2, 3:
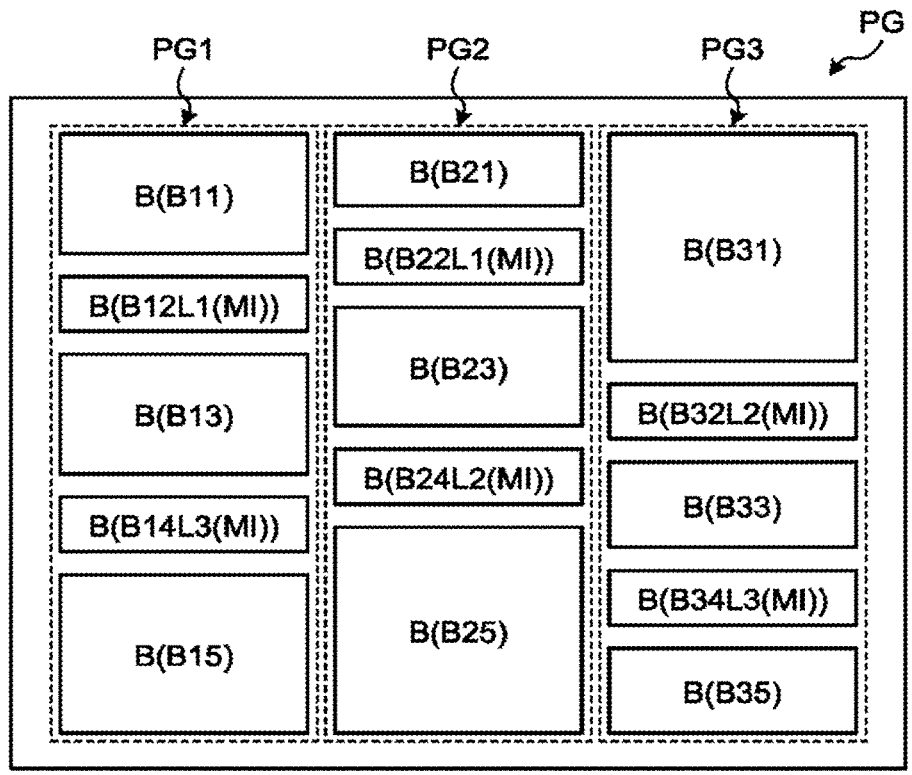
FIG. 2 is a diagram illustrating an example of a machining program stored in a program storage unit of the machining time calculating apparatus illustrated in FIG. 1.
FIG. 3 is a table illustrating a block execution time table generated by a block execution time calculation unit of the machining time calculating apparatus illustrated in FIG. 1.

FIG. 1 is a functional block diagram illustrating the configuration of a machining time calculating apparatus according to a first embodiment. FIG. 2 is a diagram illustrating an example of a machining program stored in a program storage unit of the machining time calculating apparatus illustrated in FIG. 1. FIG. 3 is a table illustrating a block execution time table generated by a block execution time calculation unit of the machining time calculating apparatus illustrated in FIG. 1. FIG. 4 is a table illustrating wait command information output by a wait command analysis unit of the machining time calculating apparatus illustrated in FIG. 1. FIG. 4 is a table illustrating operation schedule information calculated by a system cycle time calculation unit of the machining time calculating apparatus illustrated in FIG. 1.

A machining time calculating apparatus 1 and a machining time calculating method according to the first embodiment calculate operation schedule information indicating the operation time of each of a plurality of systems 101, 102, and 103 that is included in a machine tool 100 and can be controlled independently of one another. Note that time as in the operation time, operation start time, and operation end time indicates one point in the passage of time from a reference, whereas time as in the machining time, execution time, and axis move time indicates a fixed length of time without a set reference.

The machine tool 100 is an apparatus for machining metal, wood, stone, or resin. The machine tool 100 is a numerically controlled machine tool that achieves automatic machining by numerical control. The machine tool 100 is controlled by a numerical controller 200 that executes a machining program PG describing, in a series of formats (such as in G codes), how to move a tool for machining a workpiece by the machine tool 100. The numerical controller 200 includes a computer including a Central Processing Unit (CPU) and storage such as a Random Access Memory (RAM) and a Read Only Memory (ROM), a hard disk drive, a storage device, or a combination thereof for holding the machining program PG.

The systems 101, 102, and 103 of the machine tool 100 each have at least one controllable axis, and can be controlled independently of one another by the numerical controller 200 executing the machining program PG. Note that although the machine tool 100 of the first embodiment includes the three systems 101, 102, and 103, however the number is not limited to the three systems of the systems 101, 102, and 103. The present specification describes the three systems included in the machine tool 100 as a first system 101, a second system 102, and a third system 103 when distinguishing the three systems from one another, or simply as the systems 101, 102, and 103 when not distinguishing the three systems.

As illustrated in FIG. 1, the machining time calculating apparatus 1 includes: a program storage unit 11 that stores the machining program PG describing how to move a tool for machining a workpiece by driving the machine tool 100; and a block execution time calculation unit that analyzes the machining program PG to generate a block execution time table TB1. Note that the machining program PG is stored in the numerical controller 200 in addition to the program storage unit 11. FIG. 1 thus associates the machining program PG stored in the program storage unit 11 with the machining program PG stored in the numerical controller 200 using a double-headed arrow. The machining time calculating apparatus 1 includes: a wait command analysis unit 13 that analyzes the machining program PG to output a wait command information table TB2 as wait command information; a system cycle time calculation unit 14 that calculates the operation schedule information SI on the basis of the block execution time table TB1 and the wait command information table TB2; and a display 15 that displays the operation schedule information SI calculated.

The machining program PG stored in the program storage unit 11 is a program describing, in a series of formats (such as in G codes), how to move a tool for machining a workpiece by the machine tool 100. The machining program PG includes: a first system machining program PG1 corresponding to the first system 101; a second system machining program PG2 corresponding to the second system 102; and a third system machining program PG3 corresponding to the third system 103. The first system machining program PG1, the second system machining program PG2, and the third system machining program PG3 each include at least one block B in which a command code is described. In the first embodiment, the block B corresponds to the head to ";" at the tail of each line, where one block B includes several words.

The block B specifies an axis move command or an auxiliary function command. The axis move command specifies a path for moving a tool and speed along the path. The auxiliary function cogs and includes: a T code designating a tool; an S code specifying the rotational speed of a spindle; an M code specifying the start of rotation of the spindle, the start or end of rotation of the spindle, the start or stop of a coolant, or the like; or a wait command MI. The wait command MI is a command for simultaneously starting the operation of two or more of the systems 101, 102, and 103. The operation that causes two or more of the systems 101, 102, and 103 to start simultaneously can be simultaneous machining that performs machining simultaneously, or a hand-over operation that hands over a workpiece among the plurality of systems 101, 102, and 103.

As illustrated in FIG. 2, the machining program PG includes: the first system machining program PG1 corresponding to the first system 101 and controlling the first system 101; the second system machining program PG2 corresponding to the second system 102 and controlling the second system 102; and the third system machining program PG3 corresponding to the third system 103 and controlling the third system 103.

As the blocks B, the first system machining program PG1 includes: a first block B11; a second block B12L1; a third block B13; a fourth block B14L3; and a fifth block B15. The first system machining program PG1 causes the first system 101 to execute in turn the operation specified by each of the first block B11, the second block B12L1, the third block B13, the fourth block B14L3, and the fifth block B15.

As the blocks B, the second system machining program PG2 includes: a first block B21; a second block B22L1; a third block B23; a fourth block B24L2; and a fifth block B25. The second system machining program PG2 causes the second system 102 to execute in turn the operation specified by each of the first block B21, the second block B22L1, the third block B23, the fourth block B24L2, and the fifth block B25.

As the blocks B, the third system machining program PG3 includes: a first block B31; a second block B32L2; a third block B33; a fourth block B34L3; and a fifth block B35. The third system machining program PG3 causes the third system 103 to execute in turn the operation specified by each of the first block B31, the second block B32L2, the third block B33, the fourth block B34L3, and the fifth block B35.

Note that in the present specification, the blocks B are denoted by the reference characters B11, B12L1, B13, B14L3, B15, B21, B22L1, B23, B24L2, B25, B31, B32L2, B33, B34L3, and B35 when the blocks B are to be distinguished from one another; or denoted by the reference character "B" when the blocks B are not to be distinguished from one another.

The first blocks B11, B21, and B31; the third blocks B13, B23, and B33; and the fifth blocks B15, B25, and B35; each specify the axis move command or the auxiliary function command excluding the wait command MI. The second blocks B12L1, B22L1, and B32L2 and the fourth blocks B14L3, B24L2, and B34L3 each specify the wait command MI being the auxiliary function command.

The second block B12L1 specifying a first wait command MI of the first system machining program PG1 is associated with the second block B22L1 specifying a first wait command MI of the second system machining program PG2. The second blocks B12L1 and B22L1 allow for simultaneous start of the operations specified by the third block B13 of the first system machining program PG1 and the third block B23 of the second system machining program PG2. A wait command identification number of each of the second blocks B12L1 and B22L1 is designated using an L address and is "L1".

The fourth block B24L2 specifying a second wait command MI of the second system machining program PG2 is associated with the second block B32L2 specifying a first wait command MI of the third system machining program PG3. The fourth block B24L2 and the second block B32L2 allow for simultaneous start of the operations specified by the fifth block B25 of the second system machining program PG2 and the third block B33 of the third system machining program PG3. A wait command identification number of each of the fourth block B24L2 and the second block B32L2 is "L2".

The fourth block B14L3 specifying a second wait command MI of the first system machining program PG1 is associated with the fourth block B34L3 specifying a second wait command MI of the third system machining program PG3. The fourth blocks B14L3 and B34L3 allow for simultaneous start of the operations specified by the fifth block B15 of the first system machining program PG1 and the fifth block B35 of the third system machining program PG3. A wait command identification number of each of the fourth blocks B14L3 and B34L3 is "L3". Although the first embodiment uses the L address to designate the wait command identification numbers of the second blocks B12L1, B22L1, and B32L2 and the fourth blocks B14L3, B24L2, and B34L3, the present invention may designate the wait command identification number using something other than the L address. Moreover, the first embodiment places one block B that specifies the axis move command or the auxiliary function command excluding the wait command MI between the blocks B that specify the wait commands MI in each of the machining programs PG1, PG2, and PG3. However, the present invention can place a plurality of blocks B that specifies the axis move command or the auxiliary function command excluding the wait command MI between the blocks B that specify the wait commands MI.

As illustrated in FIG. 3, the block execution time table TB1 indicates the execution time which is the time required for each of the systems 101, 102, and 103 to execute the operation specified by each block B. As illustrated in FIG. 4, the wait command information table TB2 indicates the blocks B among the plurality of systems 101, 102, and 103 that are associated by the wait command MI. In the first embodiment, the wait command information table TB2 indicates the correspondence among the wait command identification number, the number assigned to each of the systems 101, 102, and 103, and the number assigned to each of the blocks B.

The operation schedule information SI is the most efficient operation schedule information SI in which the operation start times of the systems 101, 102, and 103 are adjusted to cut the wait time, and indicates the operation time of each of the systems 101, 102, and 103 as illustrated in FIG. 5. In the first embodiment, the operation schedule information SI indicates the operation start time, the operation end time, and the cycle time which is the time required for the operation of each of the systems 101, 102, and 103. In the first embodiment, the operation schedule information SI indicates the operation start time, the operation end time, and the cycle time indicating the time required for the operation of each of the systems 101, 102, and 103. However, the operation schedule information may include any one of the operation start time and cycle time of each of the systems 101, 102, and 103, the operation start time and operation end time of each of the systems 101, 102, and 103, and the operation end time and cycle time of each of the systems 101, 102, and 103.

Figure 6:
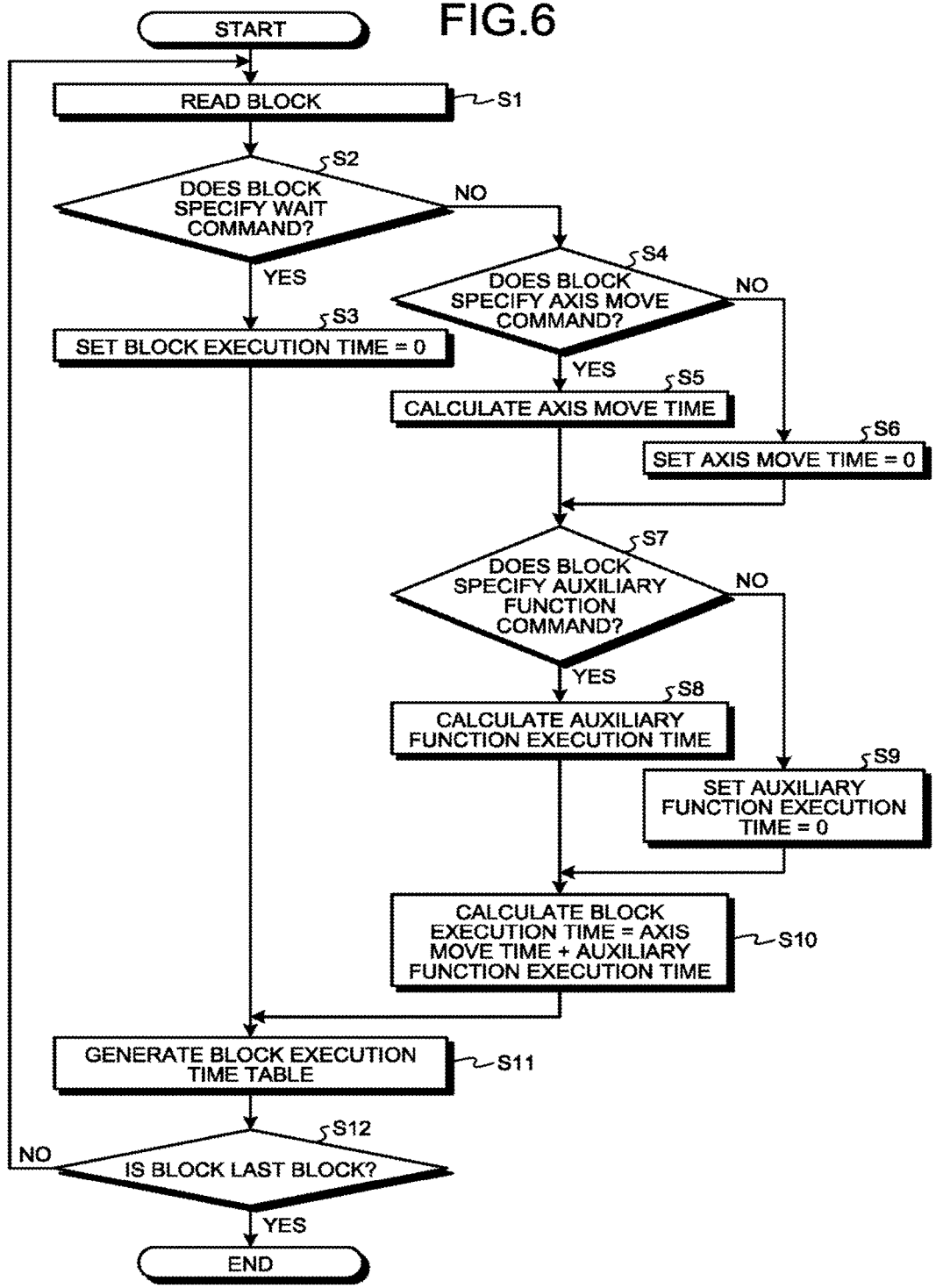
FIG. 6 is a flowchart illustrating the flow of processing in which the block execution time table is generated by the block execution time calculation unit of the machining time calculating apparatus illustrated in FIG. 1.

The following is the description of the process in which the block execution time table TB1 is generated by the block execution time calculation unit 12 of the machining time calculating apparatus 1. FIG. 6 is a flowchart illustrating the flow of processing in which the block execution time table is generated by the block execution time calculation unit of the machining time calculating apparatus illustrated in FIG. 1.

The block execution time calculation unit 12 calculates block execution time which is the execution time of each block B in the machining program PG on the basis of the machining program PG, and generates the block execution time table TB1 illustrated in FIG. 3. The block execution time calculation unit 12 reads one of the blocks B in the machining program PG stored in the program storage unit 11 (step S1). The block execution time calculation unit 12 reads one of the blocks in the first system machining program PG1 in order from the first block B11 to the fifth block B15, reads one of the blocks in the second system machining program PG2 in order from the first block B21 to the fifth block B25, and reads one of the blocks in the third system machining program PG3 in order from the first block B31 to the fifth block B35.

The block execution time calculation unit 12 determines whether or not the block B being read specifies the wait command MI (step S2). Upon determining that the block specifies the wait command MI (Yes in step S2), the block execution time calculation unit sets the block execution time to zero (step S3). Upon determining that the block B being read does not specify the wait command MI (No in step S2), the block execution time calculation unit 12 determines whether or not the block B being read specifies the axis move command (step S4). Upon determining that the block specifies the axis move command (Yes in step S4), the block execution time calculation unit 12 calculates axis move time from the move distance and the feed speed specified by the axis move command (step S5). Upon determining that the block does not specify the axis move command (No in step S4), the block execution time calculation unit 12 sets the axis move time to zero (step S6).

The block execution time calculation unit 12 determines whether or not the block B being read specifies the auxiliary function command (step S7). Upon determining that the block specifies the auxiliary function command (Yes in step S7), the block execution time calculation unit 12 calculates auxiliary function execution time to be preset time (step S8). Upon determining that the block does not specify the auxiliary function command (No in step S7), the block execution time calculation unit 12 sets the auxiliary function execution time to zero (step S9). The block execution time calculation unit 12 adds the axis move time and the auxiliary function execution time being calculated and calculates the block execution time of the block B being read (step S10).

The block execution time calculation unit 12 generates the block execution time table TB1 by recording the block execution time of the block B being read along with the number assigned to the corresponding system 101, 102, or 103 and the number assigned to the corresponding block B, as illustrated in FIG. 3 (step S11). The block execution time calculation unit 12 determines whether or not the block B being read is the last block, that is, in the first embodiment, whether or not the block is the fifth block B15 in the first system machining program PG1 (step S12). The block execution time calculation unit 12 returns to step S1 upon determining that the block B being read is not the last block (No in step S12), or ends calculation of the block execution time for the first system machining program PG1 upon determining that the block B being read is the last block (Yes in step S12). Next, as with the first system machining program PG1, the block execution time calculation unit 12 calculates the block execution time for the second system machining program PG2 according to the flowchart illustrated in FIG. 6. Upon completing the calculation of the block execution time for the second system machining program PG2, the block execution time calculation unit 12 calculates the block execution time for the third system machining program PG3 according to the flowchart illustrated in FIG. 6. Mote that steps S1 to S12 in FIG. 6 correspond to a block execution time calculating step of calculating the block execution time which is the execution time of each block B in each of the systems 101, 102, and 103 on the basis of the machining program PG of the machine tool 100.

Figure 7:
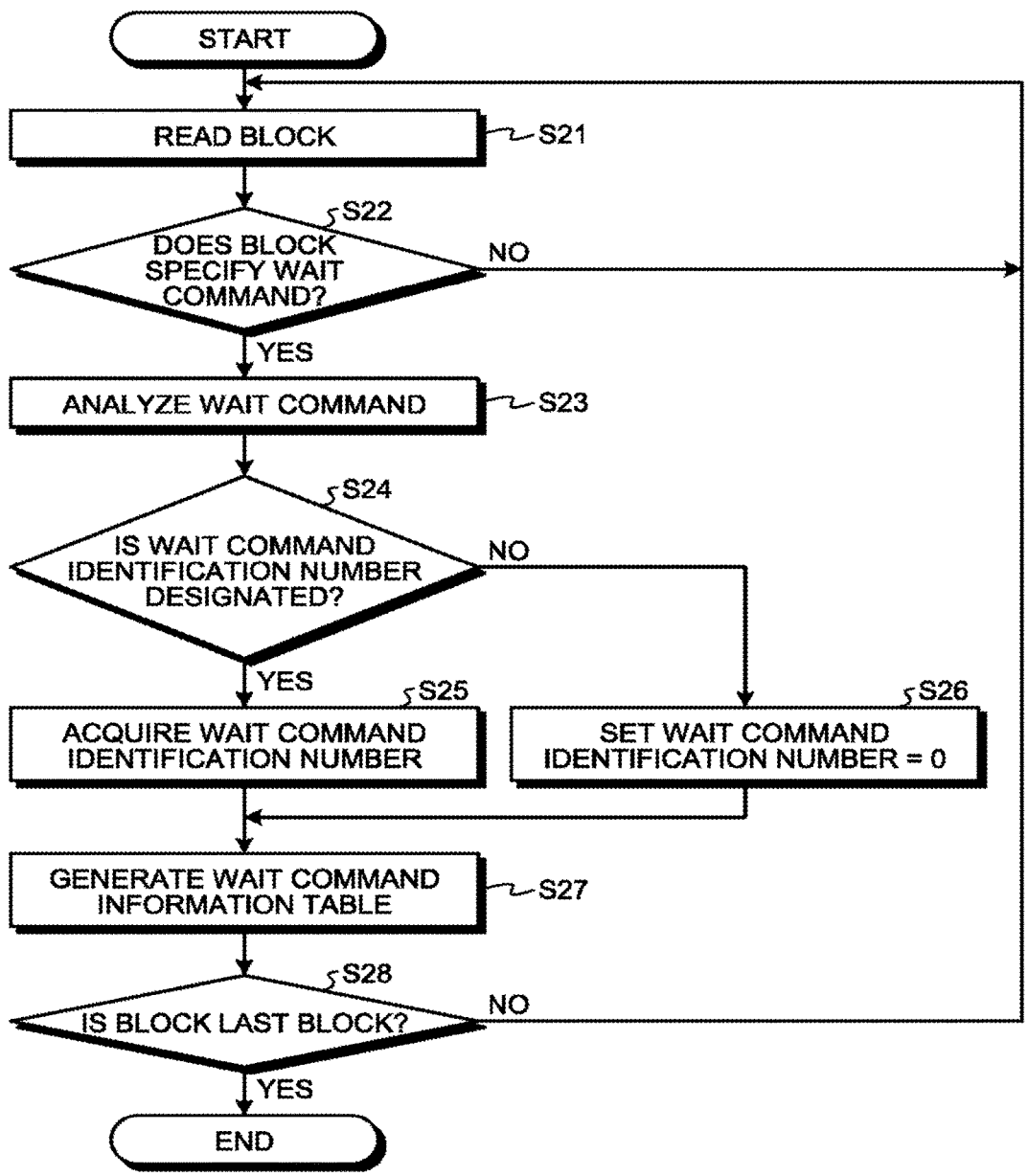
FIG. 7 is a flowchart illustrating the flow of processing in which a wait command information table is output by the wait command analysis unit of the machining time calculating apparatus illustrated in FIG. 1.

The following is the description of the process in which the wait command information table TB2 illustrated in FIG. 4 is output by the wait command analysis unit 13 of the machining time calculating apparatus 1. FIG. 7 is a flowchart illustrating the flow of processing in which the wait command information table is output by the wait command analysis unit of the machining time calculating apparatus illustrated in FIG. 1.

The wait command analysis unit 13 analyzes the wait commands MI among the plurality of systems 101, 102, and 103 described in the machining program PG, and outputs the wait command information table TB2 which is the wait command information. The wait command analysis unit 13 reads one of the blocks B in the machining program PG stored in the program storage unit 11 (step S21). The wait command analysis unit 13 reads one of the blocks in the first system machining program PG1 in order from the first block B11 to the fifth block B15, reads one of the blocks in the second system machining program PG2 in order from the first block B21 to the fifth block B25, and reads one of the blocks in the third system machining program PG3 in order from the first block B31 to the fifth block B35.

The wait command analysis unit 13 determines whether or not the block B being read specifies the wait command MI (step S22), and returns to step S21 upon determining that the block does not specify the wait command MI (No in step S22). In step S21, the wait command analysis unit 13 reads the next one of the blocks B. Upon determining that the block B being read specifies the wait command MI (Yes in step S22), the wait command analysis unit 13 analyzes the wait command MI specified by the block B being read (step S23).

In step S23, the wait command analysis unit 13 extracts the number assigned to the system 101, 102, or 103 corresponding to the block B that specifies the wait command MI, and the number assigned to the block B12L1, B14L3, B22L1, B24L2, B32L2, or B34L3 in the system 101, 102, or 103 corresponding to the block B that specifies the wait command MI. The wait command analysis unit 13 extracts the number assigned to the system 101, 102, or 103 having the block B associated with the block B being read, and the number assigned to the block B12L1, B14L3, B22L1, B24L2, B32L2, or B34L3 associated with the block B being read.

The wait command analysis unit determines whether or not the wait command identification number is designated for the block B specifying the wait command MI being read (step S24). If the wait command identification number is not designated (No in step S24), the wait command analysis unit 13 sets the wait command identification number to zero (step S26). If the wait command identification number is designated (Yes in step S24), the wait command analysis unit 13 acquires the wait command identification number designated (step S25). The wait command analysis unit 13 generates the wait command information table TB2 as illustrated in FIG. 4 on the basis of the result of the analysis (step S27).

The wait command analysis unit 13 determines whether or not the block B being read is the last block, that is, in the first embodiment, whether or not the block is the fifth block B15 in the first system machining program PG1 (step S28). The wait command analysis unit 13 returns to step S21 upon determining that the block B being read is not the last block (No in step S28), or ends the analysis on the wait command MI for the first system machining program PG1 upon determining that the block B being read is the last block (Yes in step S28). Next, as with the first system machining program PG1, the wait command analysis unit 13 analyzes the wait command MI for the second system machining program PG2 according to the flowchart illustrated in FIG. 7. Upon completing the analysis on the wait command MI for the second system machining program PG2, the wait command analysis unit 13 analyses the wait command MI for the third system machining program PG3 according to the flowchart illustrated in FIG. 7. Note that steps S21 to S28 of FIG. 7 correspond to a wait command analyzing step of outputting the wait command information table TB2 by analyzing the wait commands MI among the plurality of systems 101, 102, and 103 described in the machining program PG.

Figure 8:
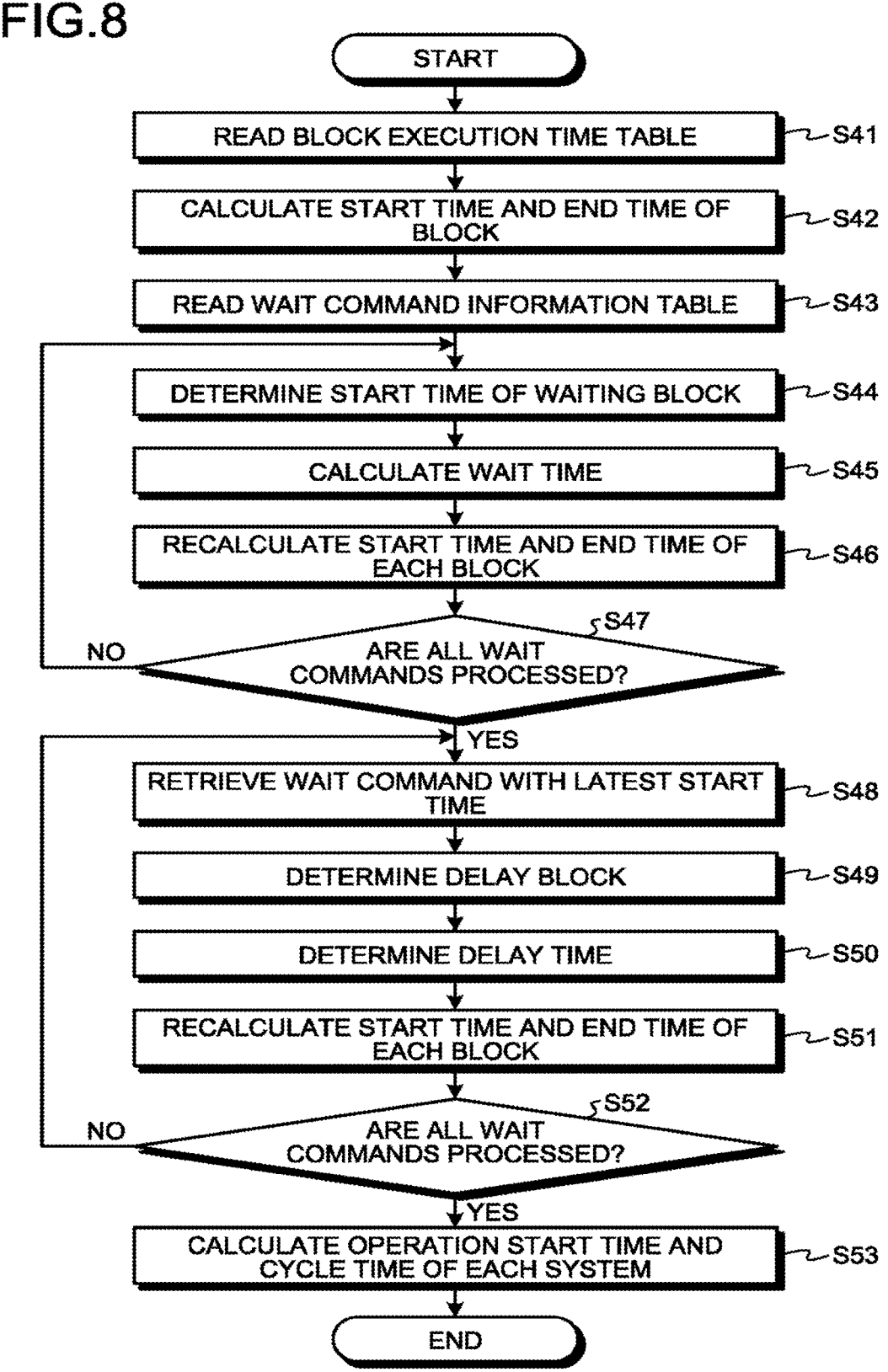
FIG. 8 is a flowchart illustrating the flow of processing in which the operation schedule information is calculated by the system cycle time calculation unit of the machining time calculating apparatus illustrated in FIG. 1.
Figure 11:
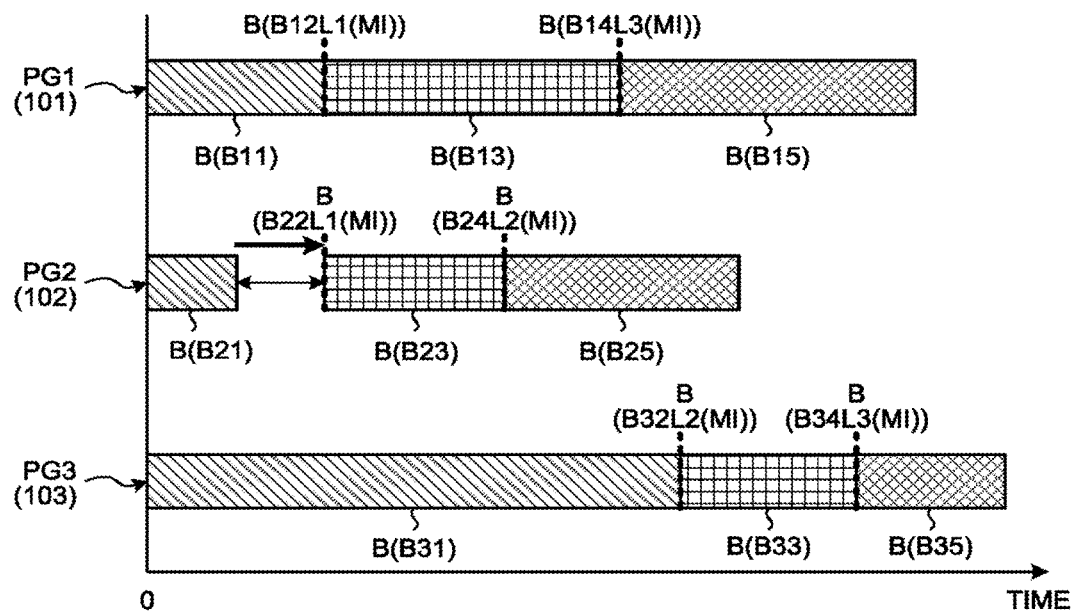
FIG. 11 is a diagram illustrating an example of a time chart generated from operation start times and operation end times of the blocks that are calculated in step S46 of FIG. 8.
Figure 12:
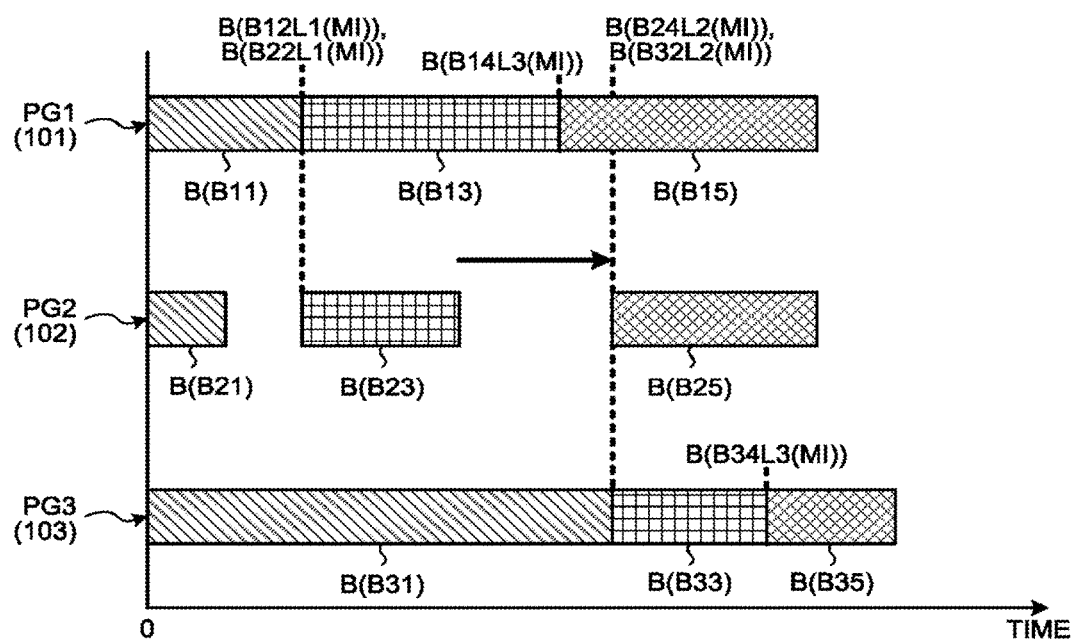
FIG. 12 is a diagram illustrating an example of a time chart generated from operation start times and operation end times of the blocks that are calculated after step S46 of FIG. 8 is executed against a subsequent wait command.
Figure 13:
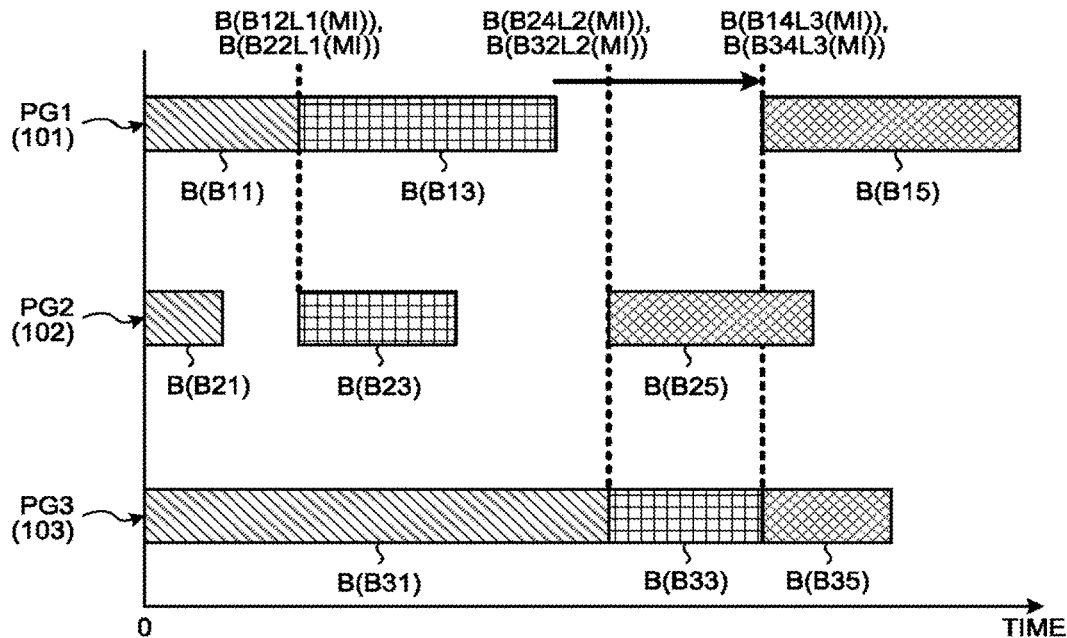
FIG. 13 is a diagram illustrating an example of a time chart generated from operation start times and operation end times of the blocks that are calculated after step S46 of FIG. 8 is executed against a next subsequent wait command.

The following is the description of the process in which the operation schedule information SI is output by the system cycle time calculation unit 14 of the machining time calculating apparatus 1. FIG. 8 is a flowchart illustrating the flow of processing in which the operation schedule information is calculated by the system cycle time calculation unit of the machining time calculating apparatus illustrated in FIG. 1. FIG. 9 is a diagram illustrating an example of a time chart generated from operation start times and operation end times of the blocks that are calculated in step S42 of FIG. 8. FIG. 10 is a diagram illustrating an example of a time chart generated from operation start times and operation end times of the blocks that are calculated in step S43 of FIG. 8. FIG. 11 is a diagram illustrating an example of a time chart generated from operation start times and operation end times of the blocks that are calculated in step S46 of FIG. 8. FIG. 12 is a diagram illustrating an example of a time chart generated from operation start times and operation end times of the blocks that are calculated after step S46 of FIG. 8 is executed against a subsequent wait command. FIG. 13 is a diagram illustrating an example of a time chart generated from operation start times and operation end times of the blocks that are calculated after step S46 of FIG. 8 is executed against a next subsequent wait command.

Figure 14:
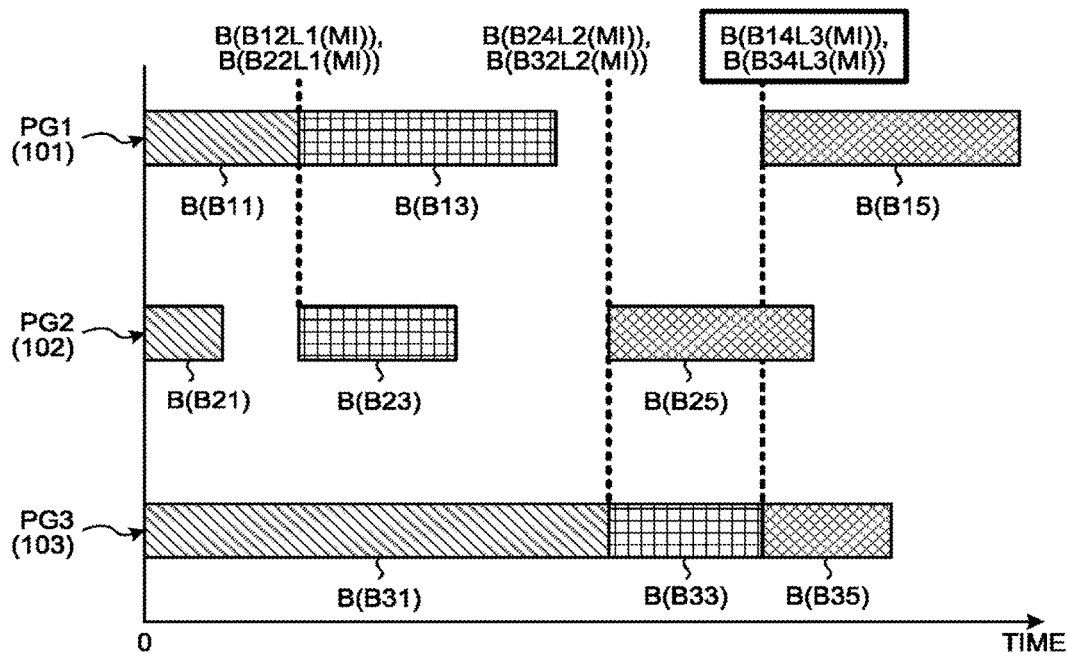
FIG. 14 is a diagram illustrating an example of a time chart generated from operation start times and operation end times of the blocks that are calculated in step S46 of FIG. 8.
Figure 15:
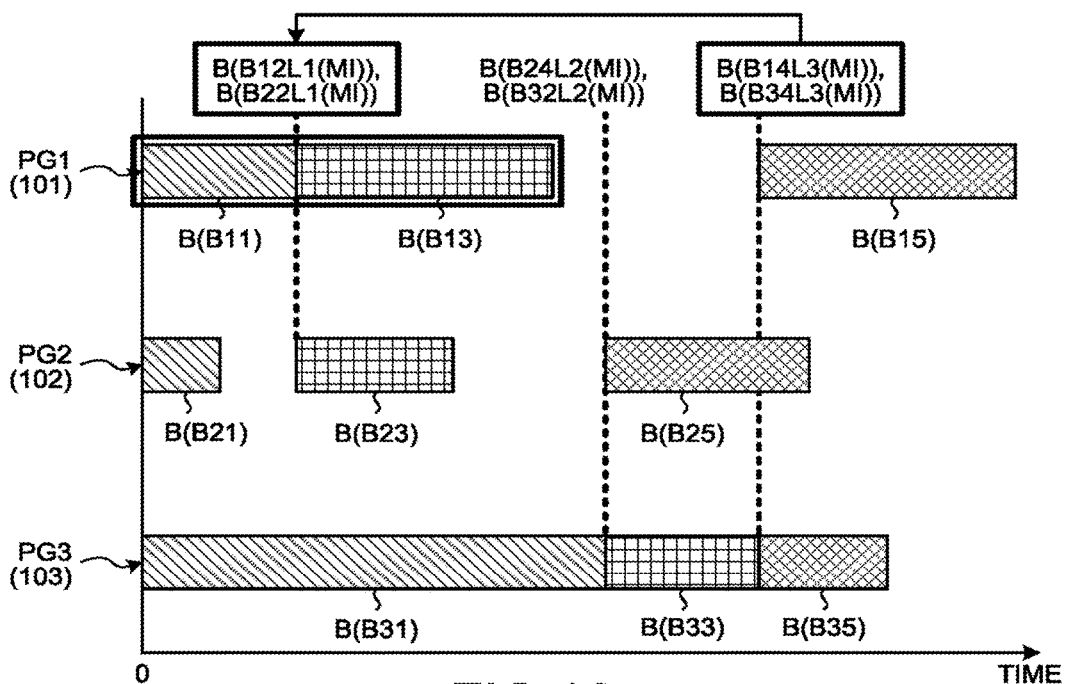
FIG. 15 is a diagram illustrating an example of a time chart generated from operation start times and operation end times of the blocks that are calculated from a part of a result of a process of determining a delay block in step S49 of FIG. 8.
Figure 16:
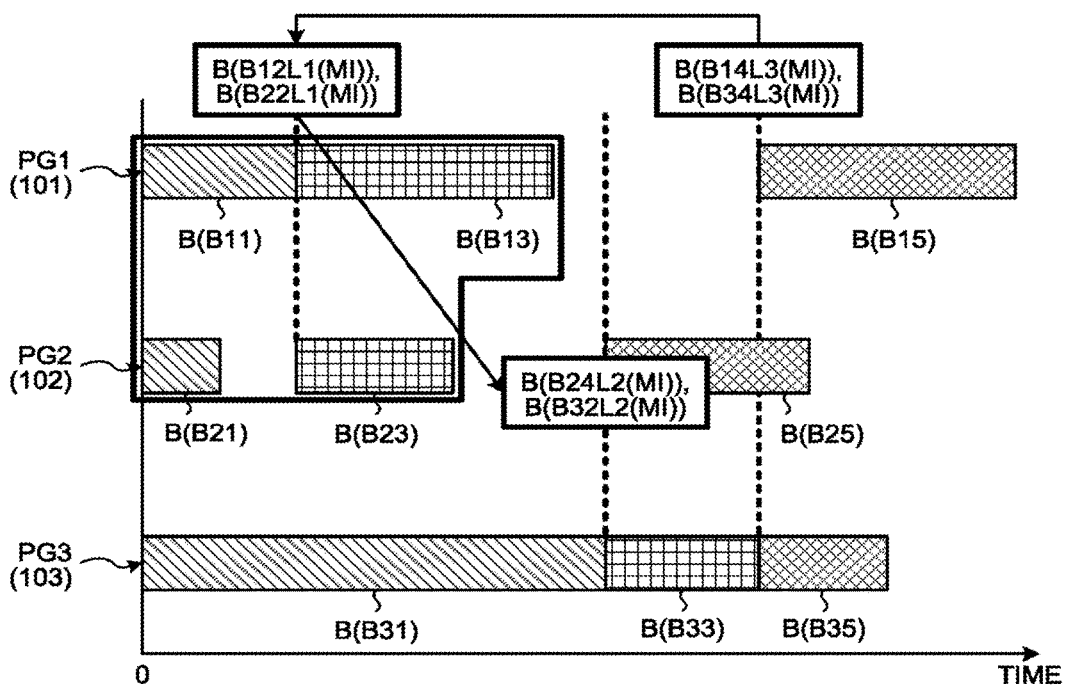
FIG. 16 is a diagram illustrating an example of a time chart generated from operation start times and operation end times of the blocks that are calculated from a result of determination of the delay block in step S49 of FIG. 8.
Figure 17:
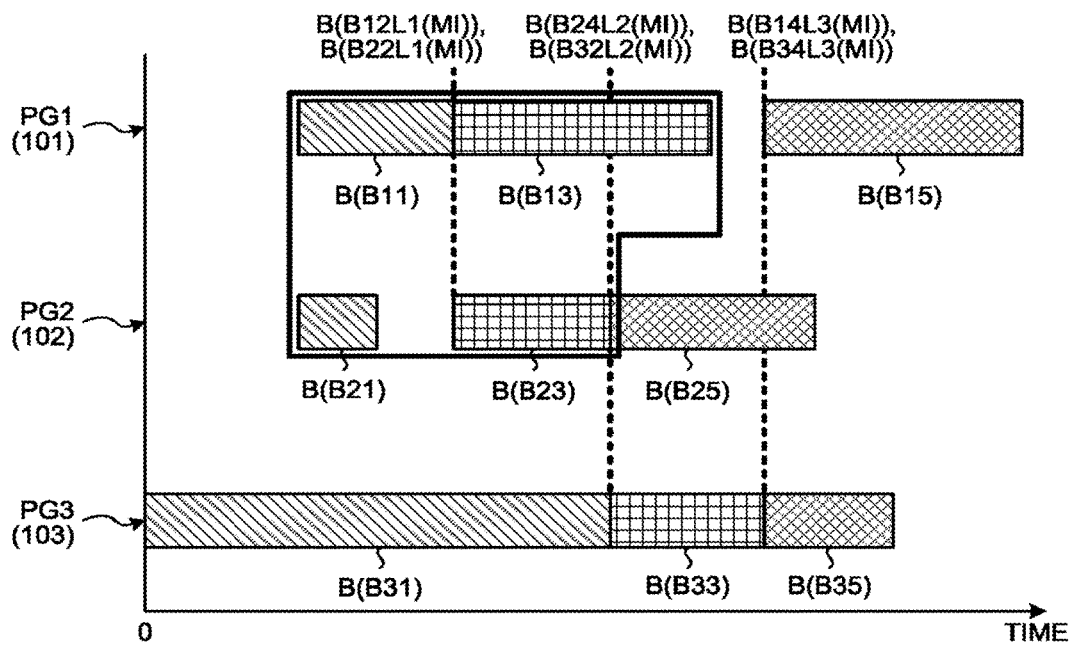
FIG. 17 is a diagram illustrating an example of a time chart generated from operation start times and operation end times of the blocks that are calculated in step S51 of FIG. 8.
Figure 18:
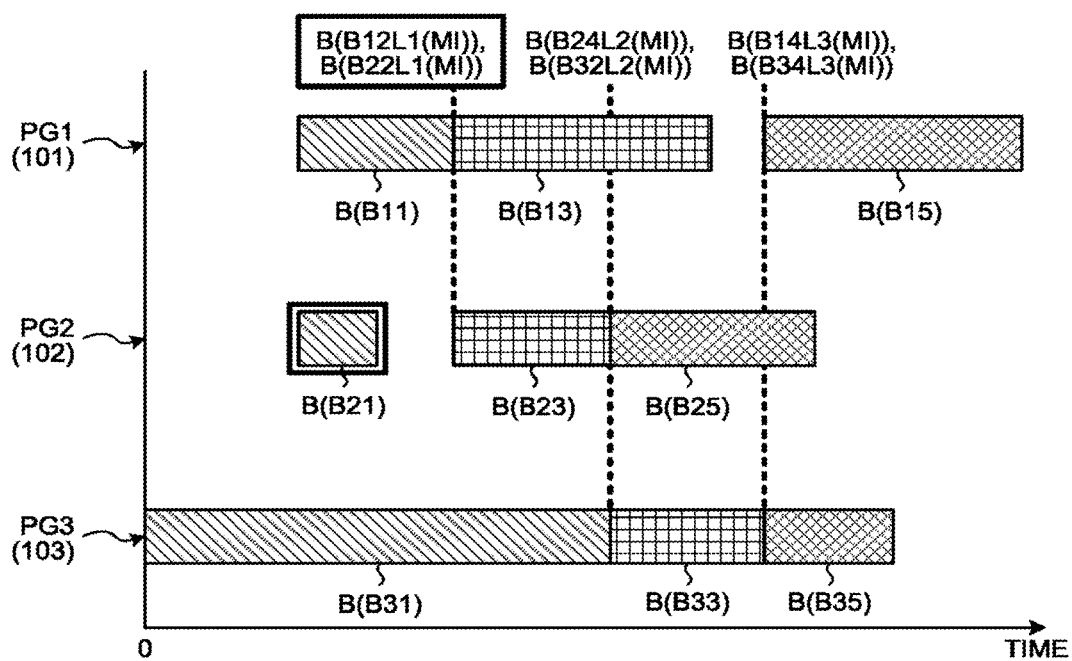
FIG. 18 is a diagram illustrating an example of a time chart generated from operation start times and operation end times of the blocks that are calculated from a next result of the determination of the delay block in step S49 of FIG. 8.
Figure 19:
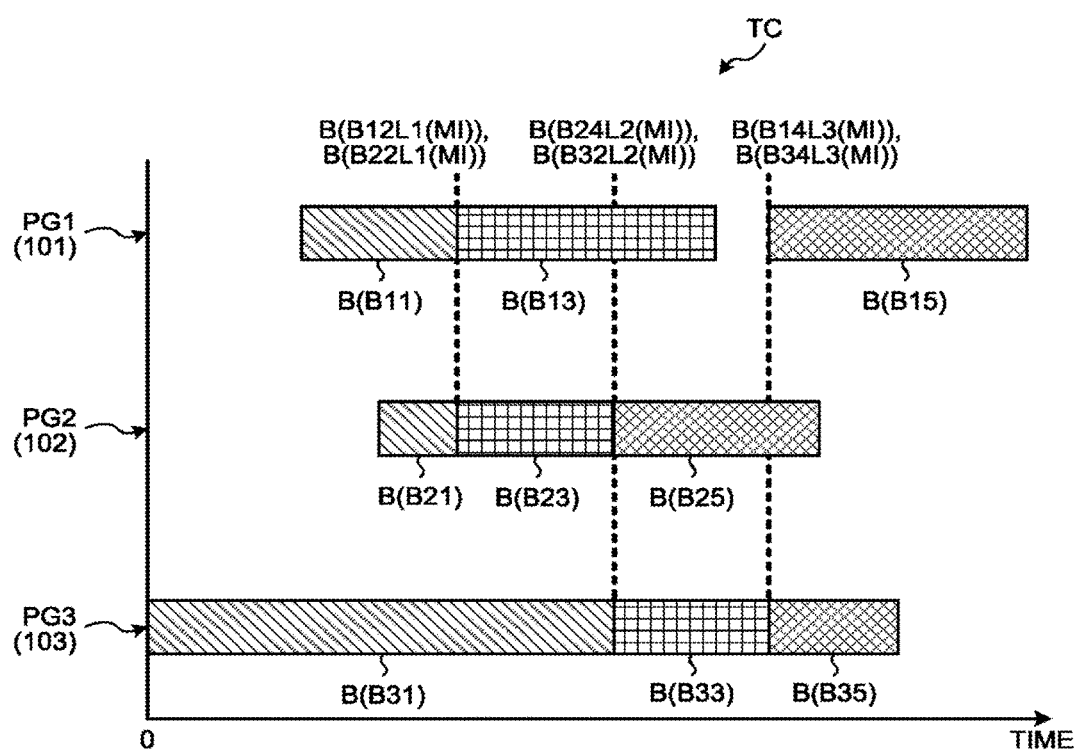
FIG. 19 is a diagram illustrating an example of a time chart after step S53 of FIG. 8 is executed.

FIG. 14 is a diagram illustrating an example of a time chart generated from operation start times and operation end times of the blocks that are calculated in step S46 of FIG. 8. FIG. 15 is a diagram illustrating an example of a time chart generated from operation start times and operation end times of the blocks that are calculated from a part of a result of a process of determining a delay block in step S49 of FIG. 8. FIG. 16 is a diagram illustrating an example of a time chart generated from operation start times and operation end times of the blocks that are calculated from a result of determination of the delay block in step S49 of FIG. 8. FIG. 17 is a diagram illustrating an example of a time chart generated from operation start times and operation end times of the blocks that are calculated in step S51 of FIG. 8. FIG. 18 is a diagram illustrating an example of a time chart generated from operation start times and operation end times of the blocks that are calculated from a next result of the determination of the delay block in step S49 of FIG. 8. FIG. 19 is a diagram illustrating an example of a time chart after step S53 of FIG. 8 is executed.

The system cycle time calculation unit 14 calculates block operation time information and wait time for each block B on the basis of the block execution time indicated in the block execution time table TB1 and the wait command information table TB2, and calculates the operation schedule information SI by adjusting the block operation time information for each block B depending on the wait time. In the first embodiment, the block operation time information corresponds to the operation start time of each block B from the start of operation of the machining program PG. That is, in the first embodiment, the block operation time information corresponds to the operation start time of each block B from the start of operation of the machining program PG when the start of operation of the machining program PG is set to zero. According to the machining time calculating apparatus 1 and the machining time calculating method of the first embodiment, the block operation time information may be the operation end time of each block B from the start of operation of the machining program PG, or may be the cumulative time before the operation start time of each block B from the start of operation of the machining program PG.

The system cycle time calculation unit 14 reads the block execution time table TB1 generated by the block execution time calculation unit 12 (step S41). The system cycle time calculation unit 14 sets the time at the start of operation of the machining program PG to zero for each of the first system machining program PG1, the second system machining program PG2, and the third system machining program PG3, and calculates the operation start times and the operation end times of the blocks B for each of the systems 101, 102, and 103 as illustrated in FIG. 9 by adding the block execution times recorded in the block execution time table TB1 in the order of execution of the blocks B (step S42).

The system cycle time calculation unit 14 reads the wait command information table TB2 generated by the wait command analysis unit 13 (step S43). In step S43, the system cycle time calculation unit 14 identifies the blocks B that specify the wait commands MI having the same wait command identification number as illustrated in FIG. 10 on the basis of the wait command information table TB2. The system cycle time calculation unit 14 identifies the second blocks B12L1 and B22L1 having the wait command identification number of "L1", the fourth block B24L2 and the second block B32L2 having the wait command identification number of "L2", and the fourth blocks B14L3 and B34L3 having the wait command identification number of "L3".

The system cycle time calculation unit 14 compares the operation start times of the plurality of blocks B that specifies the wait commands MI having the same wait command identification number. Among the operation start times compared, the system cycle time calculation unit 14 determines the latest operation start time as the operation start time for all the blocks B specifying the wait commands MI (step S44). Note that the system cycle time calculation unit 14 may compare the operation end times of the blocks B in step S44. The system cycle time calculation unit 4 calculates, as the wait time, the difference between the operation start time of the block B specifying the wait command MI that is determined in step S44 and the operation end time of the block B immediately preceding each block B specifying the wait command MI for each of the systems 101, 102, and 103 (step S45).

The system cycle time calculation unit 14 adds the wait time calculated in step S45 to the wait command information table TB2. The system cycle time calculation unit 14 recalculates the operation start times and the operation end times of the blocks B including the wait time by adding the wait time to each of the operation start times and the operation end times for all the blocks B executed after the block B specifying the wait command MI (step S46). The system cycle time calculation unit 14 determines whether or not the processing from step S44 to step S46 is performed on all the blocks B specifying the wait command MI (step S47). Upon determining that the processing from step S44 to step S46 is not performed on all the blocks B specifying the wait command MI (No in step S47), the system cycle time calculation unit 14 returns to step S44 and performs the processing from step S44 to step S46 on the block B specifying the next wait command MI.

In step S44, as illustrated in FIG. 11, the system cycle time calculation unit 14 sets the operation start times of the second blocks B12L1 and B22L1 to the operation start time of the second block B12L1 in the first system 101 which is the latest operation start time between the operation start times of the second blocks B12L1 and B22L1 specifying the wait commands MI with the wait command identification number of "L1". In step S45, the system cycle time calculation unit 14 calculates the wait time of the second block B22L1 in the second system 102. In step S46, the system cycle time calculation unit 14 calculates the operation start time and the operation end time for each of the third block B23, the fourth block B24L2, and the fifth block B25 in the second system 102.

Also in step S44, as illustrated in FIG. 12, the system cycle time calculation unit 14 sets the operation start times of the fourth block B24L2 and the second block B32L2 to the operation start time of the second block B32L2 which is the latest operation start time between the operation start times of the fourth block B24L2 and the second block B32L2 specifying the wait commands MI with the wait command identification number of "L2". In step S45, the system cycle time calculation unit 14 calculates the wait time of the fourth block B24L2 in the second system 102. In step S46, the system cycle time calculation unit 14 calculates the operation start time and the operation end time for each of the fourth block B24L2 and the fifth block B25 in the second system 102.

Also in step S44, as illustrated in FIG. 13, the system cycle time calculation unit 14 sets the operation start times of the fourth blocks B14L3 and B34L3 to the operation start time of the fourth block B34L3 in the third system 103 which is the latest operation start time between the operation start times of the fourth blocks B14L3 and B34L3 specifying the wait commands MI with the wait command identification number of "L3". In step S45, the system cycle time calculation unit 14 calculates the wait time of the fourth block B14L3 in the first system 101. In step S46, the system cycle time calculation unit 14 calculates the operation start time and the operation end time for the fifth block B15 in the first system 101.

After the system cycle time calculation unit 14 completes the processing up to step S47, the time chart of the machining program PG has the wait time: between the first block B21 and the second block B22L1 of the second system 102; between the third block B23 and the fourth block B24L2 of the second system 102; and between the third block B13 and the fourth block B14L3 of the first system 101 as illustrated in FIG. 13. In the first embodiment, the block execution time of the first block B11 of the first system 101 is 30 seconds, the block execution time of the third block B13 is 50 seconds, and the block execution time of the fifth block B15 is 50 seconds. Also in the first embodiment, the block execution time of the first block B21 of the second system 102 is 15 seconds, the block execution time of the third block B23 is 30 seconds, and the block execution time of the fifth block B25 is 40 seconds. Also in the first embodiment, the block execution time of the first block B31 of the third system 103 is 90 seconds, the block execution time of the third block B33 is 30 seconds, and the block execution time of the fifth block B35 is 20 seconds. Also in the first embodiment, the wait time between the first block B21 and the second block B22L1 of the second system 102 is 15 seconds. The wait time between the third block B23 and the fourth block B24L2 of the second system 102 is 30 seconds. The wait time between the third block B13 and the fourth block B14L3 of the first system 101 is 40 seconds. In the time chart illustrated in FIG. 13, the operation start times of the systems 101, 102, 103 coincide with one another.

Upon determining that the processing from step S44 to step S46 is performed on all the blocks B specifying the wait commands MI (Yes in step S47), the system cycle time calculation unit 14 retrieves, from among the blocks specifying the wait commands MI and having the wait time, the block B that is not yet subjected to processing of steps S49 and S50 (to be described) and specifies the wait command MI with the latest operation start time, on the basis of the operation start times of the blocks B calculated in step S46 and the wait command information table TB2 (step S48).

As the block B that is not yet subjected to the processing of steps S49 and S50 and specifies the wait command MI with the latest operation start time, the system cycle time calculation unit 14 in step S48 retrieves the fourth block B14L3 of the first system 101 specifying the wait command MI with the wait command identification number of "L3", as illustrated in FIG. 14.

The system cycle time calculation unit 14 determines, in the system 101, 102, or 103 that has the block B specifying the wait command MI retrieved in step 348, the blocks B executed before the block B specifying the wait command MI retrieved as delay blocks to be delayed according to the wait time. Next, the system cycle time calculation unit 14 retrieves the block B specifying the wait command MI that is executed last among the blocks specifying the wait commands MI executed before the block B specifying the wait command MI retrieved in the system 101, 102, or 103 that has the block B specifying the wait command MI retrieved. The system cycle time calculation unit 14 ends the processing if the block B specifying the wait command MI that is executed last does not exist. On the basis of the wait command information table TB2, the system cycle time calculation unit 14 identifies the system 101, 102, or 103 having the block B that is associated through the wait command MI with the retrieved block B specifying the wait command MI that is executed last. Within the system 101, 102, or 103 identified, the system cycle time calculation unit 14 identifies the block B that is associated through the wait command MI with the retrieved block B specifying the wait command MI that is executed last. Within the system 101, 102, and 103 identified, the system cycle time calculation unit 14 retrieves the block B specifying the wait command MI and having the wait time after the block B being associated. The system cycle time calculation unit 14 determines, as the delay block, the block B executed before the block B specifying the wait command MI and having the wait time after the block B being associated (step S49).

In step S49, the system cycle time calculation unit 14 determines the first block B11, the second block B12L1, and the third block B13 executed before the fourth block B14L3 as the delay blocks as enclosed in a box in FIG. 15 in the first system 101 that has the fourth block B14L3 specifying the wait command MI with the wait command identification number of "L3" which is retrieved in step S48. The system cycle time calculation unit 14 retrieves the second block B12L1 specifying the wait command MI with the wait command identification number of "L1" in the first system 101. The system cycle time calculation unit 14 retrieves the block B specifying the wait command MI with the wait command identification number after "L1" and having the wait time in the second system 102 having the second block B22L1 that is associated through the wait command MI with the second block B12L1 specifying the wait command MI with the wait command identification number of "L1" in the first system 101. The fourth block B24L2 specifying the wait command MI with the wait command identification number of "L2" in the second system 102 does not perform waiting with the first system 101, that the system cycle time calculation unit 14 determines, as the delay blocks, the blocks B before the fourth block B24L2 specifying the wait command MI with the wait command identification number of "L2" in the second system 102 as enclosed in a box in FIG. 16.

The system cycle time calculation unit 14 determines the delay time for the delay blocks determined in step S49 (step S50). In step S50, the system cycle time calculation unit 14 sets the wait time of the block B retrieved in step S48 as the delay time. The system cycle time calculation unit 14 acquires the wait times in the same procedure as that in step S45. The system cycle time calculation unit 14 determines the shorter wait time of the wait times acquired as the delay time.

In step S50, the system cycle time calculation unit 14 compares: the wait time of the fourth block B14L3 specifying the wait command MI with the wait command identification number of "L3" in the first system 101; with the wait time of the fourth block B24L2 specifying the wait command MI with the wait command identification number of "L2" in the second system 102; and determines the wait time of the fourth block B24L2 in the second system 102 which is the shorter wait time as the delay time.

The system cycle time calculation unit 14 recalculates the operation start time and the operation end time of each block B being the delay block determined in step S49 by adding the delay time determined in step S50 to the operation start time and the operation end time (step S51). In step S51, the system cycle time calculation unit 14 adds the wait time of the fourth block B24L2 in the second system 102 determined as the delay time to the operation start time and the operation end time of each of the blocks B11, B12L1, B13, B21, B22L1, and B23 being the delay blocks determined in step S49, as illustrated in FIG. 17.

The system cycle time calculation unit 14 determines whether the processing from step S48 to step S51 is performed on all the wait commands MI (step S52). The system cycle time calculation unit 14 returns to step S48 upon determining that the processing from step S48 to step S51 is not performed on all the wait commands MI (No in step S52).

The fourth block B24L2 and the second block B32L2 specifying the wait commands III with the wait command identification number of "L2" do not have any wait time after the wait command identification number of "L3". Therefore, the system cycle time calculation unit 14 determines, the delay block, the first block B21 in the second system 102 between the first system 101 and the second system 102 having the second blocks B12L1 and B22L1 specifying the wait commands MI with the wait command identification number of "L1", as enclosed in a box in FIG. 18. The system cycle time calculation unit 14 calculates the operation start time and the operation end time of the first block B21 in the second system 102 using the wait time of the second block B22L1 in the second system 102 as the delay time.

Upon determining that the processing from step S46 to step S51 is performed on all the wait commands MI (Yes in step S52), the system cycle time calculation unit 14 calculates the operation start time and the cycle time of each of the systems 101, 102, and 103 as illustrated in FIG. 19 from the operation start time and the operation end time of each block B calculated in step S51 (step S3). The system cycle time calculation unit 14 offsets the operation start times and the operation end times of all the blocks B such that the operation start time of the block B which is the earliest among the operation start times of the blocks B executed first in the systems 101, 102, and 103 is set to zero. The system cycle time calculation unit 14 sets the operation start times of the blocks B executed first in the systems 101, 102, and 103 after the offset as the operation start times of the systems 101, 102, and 103. The system cycle time calculation unit 14 calculates the cycle time of each of the systems 101, 102, and 103 from the operation start time and the operation end time of the block B executed last in each of the systems 101, 102, and 103. As illustrated in FIG. 5, the system cycle time calculation unit 14 generates the operation schedule information SI recording the operation start time, the cycle time, and the operation start time and operation end time of the blocks B for each of the systems 101, 102, and 103.

Note that steps S41 to S53 in FIG. 8 correspond to a system cycle time calculating step of calculating the operation schedule information SI by calculating the block operation time information and wait time for each block B in each of the systems 101, 102, and 103 on the basis of the block execution time and the wait command information table TB2, and adjusting the block operation time information to cut the wait time. In the system cycle time calculating step, the system cycle time calculation unit 14 calculates the operation schedule information SI in which the operation start times of the blocks B in the systems 101, 102, and 103 are adjusted while maintaining the wait timings among the plurality of systems 101, 102, and 103 on the basis of the wait commands MI among the plurality of systems 101, 102, and 103 described in the machining program PG. At the same time, the system cycle time calculation unit 14 adjusts the operation start times of the blocks B to reduce the difference in the operation start times among the plurality of blocks B in the systems 101, 102, and 103.

The system cycle time calculation unit 14 also generates the time chart TC illustrated in FIG. 19 on the basis of the operation schedule information SI, and outputs the generated time chart TC to the display 15. The display 15 displays the time chart TC illustrated in FIG. 19. In the first embodiment, the time chart TC has the vertical axis representing the system number and the horizontal axis representing time, and represents the execution time of each block B as a quadrangle with the unit time such as one second expressed by a predetermined length. In the first embodiment, the time chart TC displays the wait time as a blank.

In the first embodiment, the wait time of the fourth block B14L3 in the first system 101 illustrated in FIG. 19 is reduced from the wait time illustrated in FIG. 13 which is 40 seconds to 10 seconds, and the operation start time of the first system 101 is set at 30 seconds. Also in the first embodiment, the wait times of the second block B22L1 and the fourth block B24L2 in the second system 102 illustrated in FIG. 19 are both reduced to zero second. The operation start time of the second system 102 is set at 45 seconds in the first embodiment. As a result, the operation schedule information SI illustrated in FIG. 5 according to the first embodiment can use 75 seconds in total for all the systems 101, 102, and 103 for machining other than the machining based on the machining program PG.

The machining time calculating apparatus 1 and the machining time calculating method according to the first embodiment adjust the operation start times of the blocks B to reduce the difference in the operation start times while maintaining the wait timings. Moreover, the machining time calculating apparatus 1 and the machining time calculating method according to the first embodiment calculate the wait time on the basis of the block execution time table TB1 indicating the execution time of each block B and the wait command information table TB2, and adjust the block operation time information to cut the wait time. The machining time calculating apparatus 1 and the machining time calculating method can thus reduce the wait time in each of the systems 101, 102, and 103 and calculate the machining time necessary in making the production plan with high production efficiency for the machine tool 100 including the plurality of systems 101, 102, and 103 that can be controlled independently.

Second Embodiment

Figure 20:
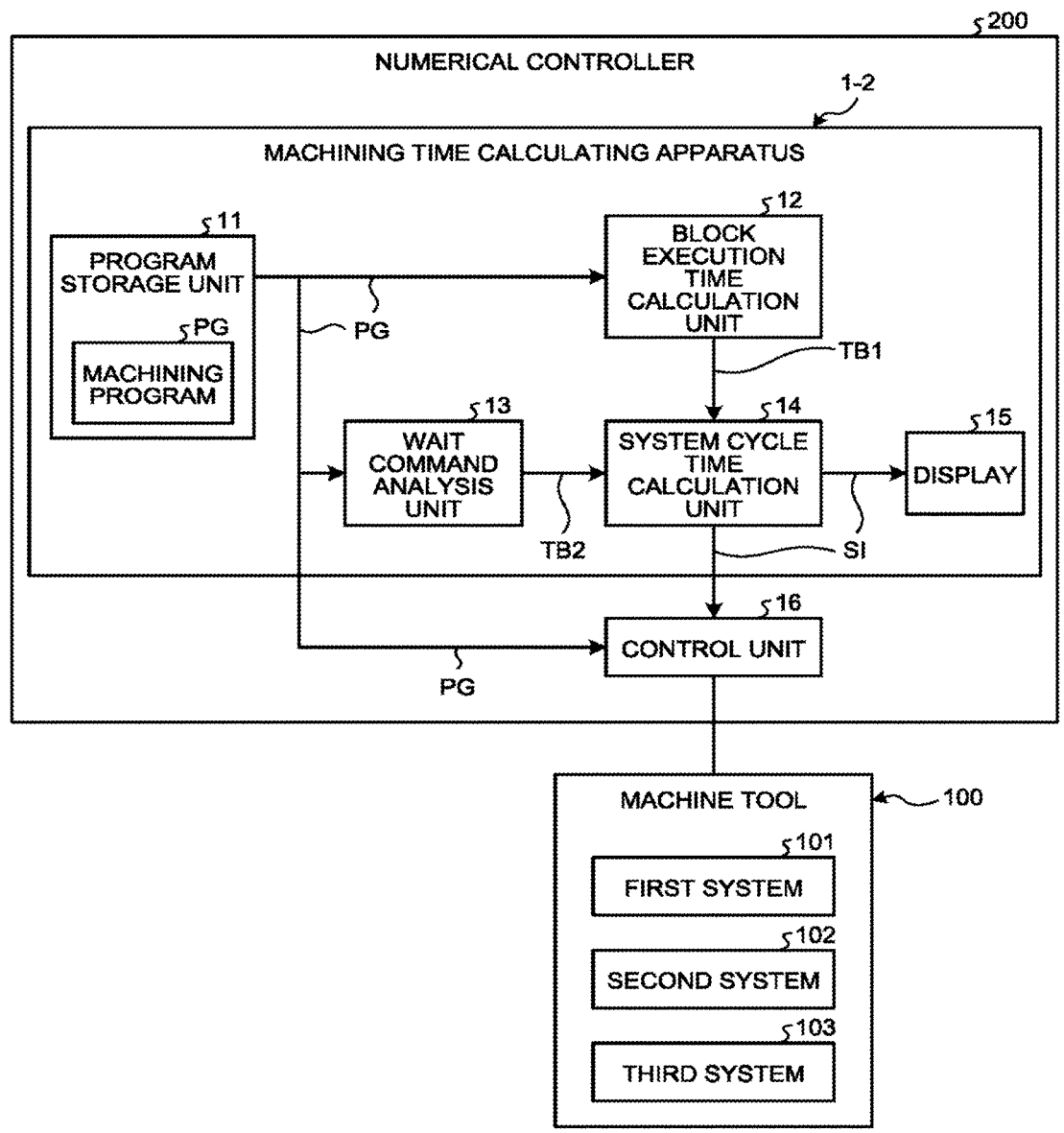
FIG. 20 is a functional block diagram illustrating the configuration of a machining time calculating apparatus according to a second embodiment.

Next, a machining time calculating apparatus 1-2 and a machining time calculating method according to a second embodiment of the present invention will be described with reference to the drawings. FIG. 20 is a functional block diagram illustrating the configuration of the machining time calculating apparatus according to the second embodiment. In FIG. 20, a part identical to that of the first embodiment will be assigned the same reference numeral as that assigned thereto and will not be described.

The machining time calculating apparatus 1-2 according to the second embodiment is the same as that of the first embodiment except for the numerical controller 200 configured as illustrated in FIG. 20. The numerical controller 200 includes a control unit 16 that causes the machine tool 100 to perform machining on the basis of: the machining program PG stored in the program storage unit 11 of the machining time calculating apparatus 1-2; and the operation schedule information SI calculated by the system cycle time calculation unit 14 of the machining time calculating apparatus 1-2.

As with the first embodiment, the machining time calculating apparatus 1-2 according to the second embodiment can reduce the wait time and calculate the machining time necessary in making the production plan with high production efficiency for the machine tool 100 including the plurality of systems 101, 102, and 103 that can be controlled independently. Moreover, the machining time calculating apparatus 1-2 according to the second embodiment is included in the numerical controller 200, and the control unit 16 of the numerical controller 200 executes the machining program PG according to the operation schedule information SI so that the production efficiency of the machine tool 100 can be improved.

Figure 21:
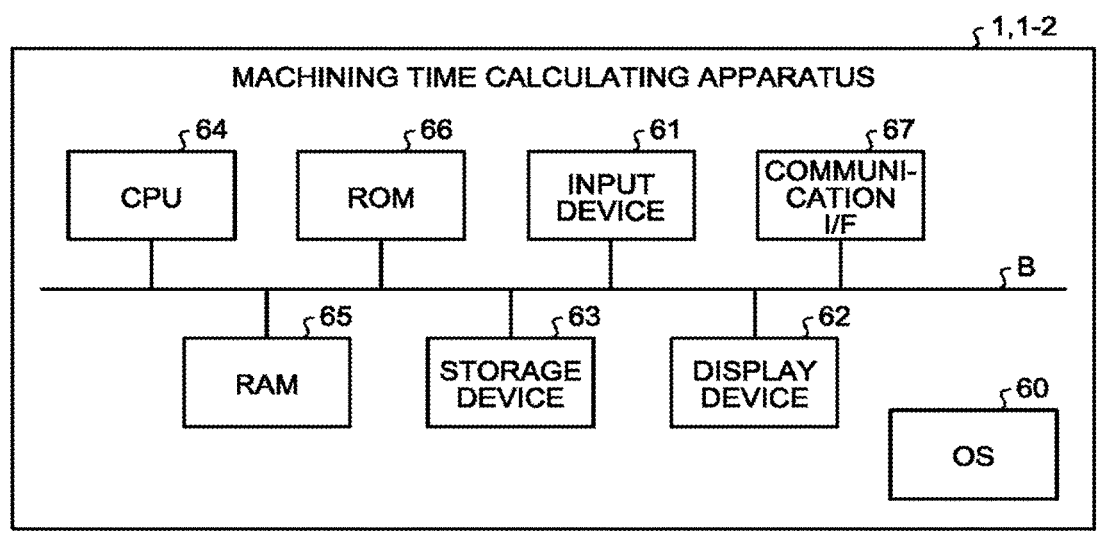
FIG. 21 is a diagram illustrating the hardware configuration of the machining time calculating apparatus according to each embodiment.

Next, the machining time calculating apparatus 1 according to the first embodiment and the machining time calculating apparatus 1-2 according to the second embodiment will be described with reference to FIG. 21 FIG. 21 is a diagram illustrating the hardware configuration of the machining time calculating apparatus according to each embodiment. Each of the machining time calculating apparatuses 1 and 1-2 according to the embodiment a computer that executes a computer program on an Operating System (OS) 60, and includes an input device 61, a display device 62, a storage device 63, a Central Processing Unit (CPU) 64, a Random Access Memory (RAM) 65, a Read Only Memory (ROM) 66, and a communication interface 67 as illustrated in FIG. 21. The CPU 64, the RAM 65, the ROM 66, the storage device 63, the input device 61, the display device 62, and the communication interface 67 are connected via a bus B.

The functions of the block execution time calculation unit 12, the wait command analysis unit 13, and the system cycle time calculation unit 14 are implemented by the CPU 64 executing a program stored in the ROM 66 and the storage device 63 while using the RAM 65 as a work area. The program is implemented by software, firmware, or a combination of software and firmware. The storage device 63 is a Solid State Drive (SSD) or a Hard Disk Drive (HDD) in the first and second embodiments but is not limited to the SSD or HDD. The function of the program storage unit 11 is implemented by the ROM 66 and the storage device 63.

The input device 61 receives a manual input from a user. The input device 61 is a keyboard or mouse in the first and second embodiments but is not limited to the keyboard or mouse. The function of the display 15 is implemented by the display device 62. The display device 62 displays characters and images. The display device 62 is for example a liquid crystal display device in the first and second embodiments.

The communication interface 67 communicates with the machine tool 100 in the second embodiment.

The configuration illustrated in the above embodiment merely illustrates an example of the content of the present invention, and can thus be combined with other known techniques or partially omitted and/or modified without departing from the scope of the present invention.

REFERENCE SIGNS LIST

1, 1-2 machining time calculating apparatus; 12 block execution time calculation unit; 13 wait command analysis unit; 14 system cycle time calculation unit; 15 display; 100 machine tool; 101, 102, 103 system; B, B11, B12L1, B13, B14L3, B15, B21, B22L1, B23, B24L2, B25, B31, B32L2, B33, B34L3, B35 block; PG machining program; MI wait command; 182 wait command information table (wait command information); TC time chart; S1, S2, S3, S4, S5, S6, S7, S8, S9, S10, S11, S12 block execution time calculating step; S21, S22, S23, S24, S25, S26, S27, S25 wait command analyzing step; S41, S42, S43, S44, S45, S46, S47, S48, S49, S50, S51, S52, S53 system cycle time calculating step; SI operation schedule information.

The invention claimed is:

1. A machining time calculating apparatus for calculating operation schedule information indicating operation time of each of a plurality of systems that is included in a machine tool and can be controlled independently of one another, the apparatus comprising
    a system cycle time calculator to calculate, on the basis of wait commands among the plurality of systems that are described in a machining program for the machine tool, wherein
    the operation schedule information in which operation start times of blocks in the machining program of each of the systems are adjusted while maintaining wait timings among the plurality of systems, wherein
    the system cycle time calculator adjusts the operation start times of the blocks to reduce a difference in the operation start times among the plurality of blocks in the systems.

2. A machining time calculating apparatus for calculating operation schedule information indicating operation time of each of a plurality of systems that is included in a machine tool and can be controlled independently of one another, the apparatus comprising:
    a block execution time calculator to calculate execution time of each block in a machining program on the basis of the machining program for the machine tool;
    a wait command analyzer to analyze wait commands among the plurality of systems described in the machining program, and output wait command information indicating blocks among the plurality of systems that are associated with each other by the wait commands; and
    a system cycle time calculator to calculate the operation schedule information by calculating block operation time information that indicates operation time of each of the blocks in each of the systems and wait time on the basis of the execution time and the wait command information, and adjusting the block operation time information of each of the blocks according to the wait time, wherein
    the system cycle time calculator adjusts the block operation time information of each of the blocks to reduce the wait time in each of the systems.

3. The machining time calculating apparatus according to claim 2, wherein
    the operation schedule information is any one of operation start time and cycle time of each of the systems, the operation start time and operation end time of each of the systems, and the operation end time and the cycle time of each of the systems.

4. The machining time calculating apparatus according to claim 2, wherein
    the block operation time information is any one of operation start time of each of the blocks from start of operation of the machining program, operation end time of each of the blocks from the start of operation of the machining program, and cumulative time before the operation start time of each of the blocks from the start of operation of the machining program.

5. The machining time calculating apparatus according to claim 2, further comprising
    a display to display a time chart that is generated on the basis of the block operation time information and the operation schedule information.

\* \* \* \* \*